United States Patent [19]

Spencer

[11] Patent Number: 4,730,861
[45] Date of Patent: Mar. 15, 1988

[54] FINGER GRIPPER WITH STATE INDICATOR

[75] Inventor: R. Mark Spencer, Waltham, Mass.

[73] Assignee: Barry Wright Corporation, Newton Lower Falls, Mass.

[21] Appl. No.: 20,153

[22] Filed: Feb. 25, 1987

Related U.S. Application Data

[63] Continuation of Ser. No. 599,767, Apr. 13, 1984, abandoned.

[51] Int. Cl.⁴ ............................ B66C 3/16; F15B 13/42
[52] U.S. Cl. ..................................... 294/86.4; 294/106; 294/907; 901/35
[58] Field of Search ............ 294/86.4, 87.24, 93, 294/95, 106, 88, 94, 99.1, 86.3, 86.31, 907; 901/35, 46, 50; 414/730, 736, 739, 741, 744 R, 753, 621

[56] References Cited

U.S. PATENT DOCUMENTS

| | | | |
|---|---|---|---|
| 3,843,187 | 10/1974 | Shaefer, Jr. et al. | 294/86.4 |
| 4,509,783 | 4/1985 | Ionescu | 294/106 |
| 4,541,771 | 9/1985 | Beni et al. | 294/86.4 |

FOREIGN PATENT DOCUMENTS 925624  5/1982  U.S.S.R. ................................ 901/35

Primary Examiner—James B. Marbert
Attorney, Agent, or Firm—Milton E. Gilbert; James W. Mitchell

[57] ABSTRACT

A positive indication of the closure state of a fingered gripper is provided by a sensor having a first element mounted for motion responsive to the primary finger driver and a second element operable in conjunction with the first element to provide, between the two, a positive indication of the gripper state.

5 Claims, 3 Drawing Figures

FINGER GRIPPER WITH STATE INDICATOR

This is a continuation of co-pending application Ser. No. 599,767, filed on Apr. 13, 1984, now abandoned.

BACKGROUND OF THE INVENTION

A. Field of the Invention

The invention relates to grippers and, more particularly, comprises a finger gripper poviding a positive indication of the closure state of the fingers.

B. Prior Art

Fingered grippers are used to firmly grasp and position objects for a variety of purposes. For example, in manufacturing operations, fingered grippers can be used to hold an object and, in conjunction with other elements, orient and position it for subsequent operations such as assembly, packaging, etc.

As increasing numbers of such grippers are being used in automatic assembly operations, problems associated with failure of such grippers can multiply.

In particular, the failure of grippers to achieve a commanded closure state (e.g., fully open, partially open, fully closed, etc.) can not only impede manufacturing operations but can damage both the objects being handled and the machinery handling them. In order to guard against this, much attention has been focused on designing grippers which are extremely rugged so as to thereby help minimize the likelihood of failure. However, this leads to relatively expensive grippers and, as a practical matter, may preclude their application to tasks for which they otherwise are suitable.

BRIEF SUMMARY OF THE INVENTION

A. Objects of the Invention

Accordingly, it is an object of the invention to provide an improved gripper.

Further, it is an object of the invention to provide a gripper which includes means for indicating its closure state.

Still a further object of the invention is to provide a gripper having a relatively economical sensor that provides a reliable indication of the closure state of the gripper fingers.

B. Brief Description of the Invention

In accordance with the present invention, a positive indication of the state of the gripper fingers (e.g., open, closed, etc.) is provided by means of a sensor having a first element mounted for motion repsonsive to motion of the primary driver element which controls the closure state of the fingers, and having a second element operable in conjunction with the first element to provide, between the two elements, an output indicative of the closure state.

In the specific physical implementation of the invention described herein, the sensor has a first element mounted directly on the force-applying means for the gripper fingers, and a second element fixedly mounted on the gripper housing. Movement between the two elements causes the sensor to generate an output indicative of the closure state. Preferably, as described herein, the first element comprises a magnet connected to the force-applying means and moveable with it, while the second element comprises a Hall-effect switch; the latter responds to the strength of the magnetic field generated by the magnet to switch its state when the magnetic field it senses is at a predetermined level corresponding to a predetermined position of the magnet and thus a corresponding predefined closure state of the fingers.

The sensor of the present invention operates to provide a reliable indication of the closure state, and thus to prevent damage to objects or machinery caused by closure malfuctions. It is simple to install in a variety of grippers, and is relatively economical to implement. Accordingly, it significantly enhances the utility of fingered grippers and broadens their range of applicability.

DETAILED DESCRIPTION OF THE INVENTION

The foregoing and other further objects and features of the invention will be more readily understood from the following detailed description of the invention, when taken in conjunction with the accompanying drawings, in which.

Figure 1:
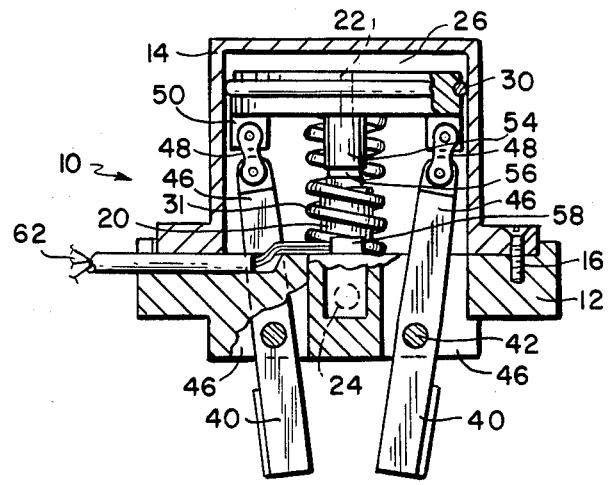
FIG. 1 is a front vertical sectional view of a fingered gripper having sensing means therein in accordance with the present invention, the sensor being shown in the non-actuated state.
Figure 2:
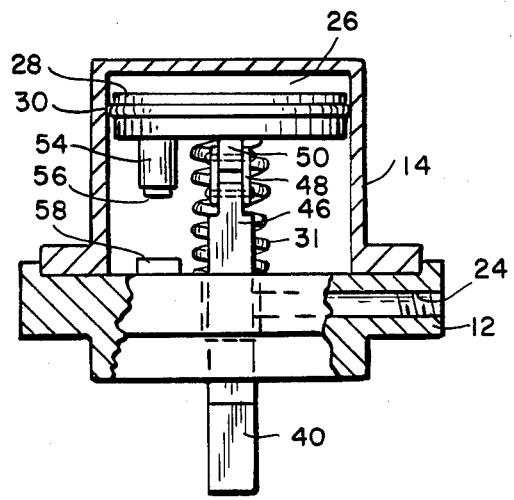
FIG. 2 is a side vertical sectional view of the gripper of FIG. 1.

In FIG. 1, a gripper 10 has a cylindrical base 12 and a corresponding cylindrical cover 14 removeably secured thereto by screws 16. A vertical shaft 20 is secured to the base 12. The shaft has a hollow bore 22 extending vertically therethrough and communicating between a corresponding hollow bore 24 formed in the base 12 and a chamber 26 formed between the cover 14 and a cylinder or piston 28 mounted for reciprocating movement within the cover. The piston 28 has and O-ring seal 30 sealing the chamber 26 from the space below the piston. A spring 31 surounds the shaft and supports the piston 28 above the base in the non-actuated state of the gripper. A bore 32 in the center of piston 28 provides a snug and substantially air-tight fit for shaft 20, allowing the piston to move downwardly with respect to the shaft when a suitable force is applied to the upper face of the piston as described below.

Gripping fingers 40 are mounted on pivots 42 fixed in the base. The fingers 40 are connected via links 48 to bosses 50 on the underside of piston 28. Clearance for rotation of these fingers about the pivots 42 is provided by means of wells 46 extending through the base to the exterior.

The gripper illustrated herein is of the interior gripper type, that is, the fingers 40 are closest together at their remote (gripping) ends when the gripper is not actuated, and are moved apart when the gripper is actuated. The fingers are thus designed to move against the interior walls of an object when the gripper is actuated, so as to thereby enable grasping of an object from the interior and subsequent positioning or movement of the object.

Mounted on the underside of cylinder 28 is a positioning rod 54 carrying a magnet 56 on the remote end thereof. This magnet constitutes the first element of a position sensor used in the present invention. The second element is constituted by a switch 58 which responds to the magnetic field generated by magnet 56 to provide an output indicative of the relative position between the magnet 56 and the switch 58. In the illustrative embodiment described herein, the switch 58 is preferably a Hall-effect position sensor. For example, a Model 5SS Hall Effect Position Sensor made by Microswitch, Inc. has been used in a physical embodiment of the invention.

Electrical leads 60 extend through a bore 62 in the base 12 and provide means for supplying electric power to the switch 58, as well as for receiving the output signal therefrom. In operation, the bore 24 is connected to a source of pneumatic pressure, e.g., a tank of compressed air, and the leads 60 are connected to the appropriate electrical power source and signal-receiving instruments. When the pressurized air is supplied to the bore 24, it is conducted via the channel 12 into chamber 26, thereby driving piston 28 downwardly.

Figure 3:
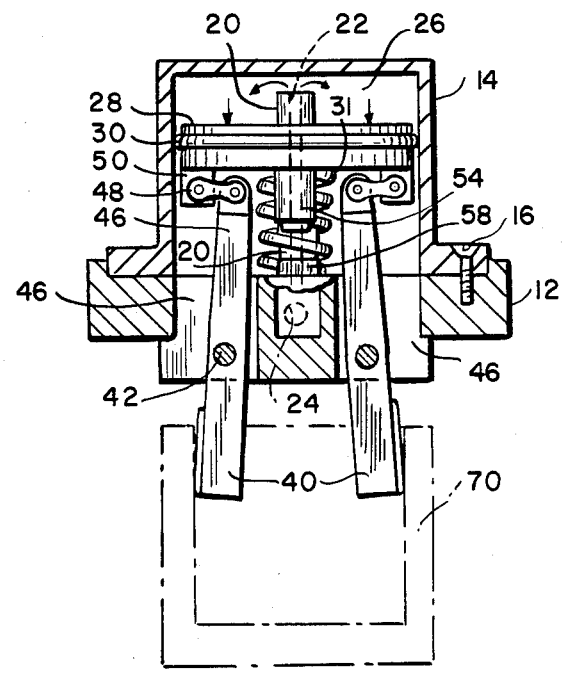
FIG. 3 is a front vertical sectional view of the gripper of FIG. 1 showing the gripper in its fully actuated position.

Piston 28 serves as the primary driving element for applying a force through links 48 to fingers 40. As the piston moves downwardly, it causes the links 48 to rotate the fingers 40 about pivots 42, the left-hand link in FIG. 1 being rotated in the clockwise direction about its pivot, while the right hand link is rotated in a counterclockwise direction about its pivot. Accordingly, the remote end of the fingers (that is, the end remote from the links 48) open to move against the inner walls of a part 70 and firmly grasp it as shown in FIG. 3.

When the piston 28 moves downwardly, it carries with it rod 54 and magnet 56. As the latter advances towards the sensor element 58, it creates a magnetic field of increasing strength at the sensing element. The strength of the magnet 56, and its physical position vis-a-vis the element 58, are so proportioned that the element 58 provides an output signal of defined value at, or just before, the time that the fingers 40 have been rotated to the position shown in FIG. 3. This unambiguously indicates that the arms have reached the desired position, and that the sensor is operating properly.

From the foregoing, it will be seen that a sensor in accordance with the present invention provides a reliable indication of the achievement of a desired closure state by the sensor without requiring unusual provisions to otherwise increase the mechanical reliability of the gripper. The sensor is simple and rugged in construction, and economical to utilize in a variety of grippers and thereby extends their range of operation to applications in which more expensive grippers might otherwise be required.

It will be understood by those skilled in the art that various changes may be made in the physical embodiment described herein without departing from the spirit or the scope of the invention. Accordingly, it is intended that the foregoing be taken as illustrative only, and not in a limited sense, the scope of the invention being defined with particularity in the claims.

Having illustrated and described my invention, I claim:

1. In a fingered gripper having a driver for moving gripper fingers toward a defined state, the improvement comprising a Hall-effect sensor having (i) a first element mounted on said driver and movable therewith and including magnet means for generating a magnetic field, and (ii) a second element including a Hall-effect generator mounted on said fingered gripper and responsive to the magnetic field generated by said magnet means to provide an output signal indicative of the strength thereof as determined at said second element, which output signal is, in turn, indicative of the relative positions of said first and second elements and, thereby, of the corresponding state of the gripper fingers.

2. In a fingered gripper having a plurality of fingers movable with respect to one another, and a gripper housing, said gripper actuable in response to an input signal to apply a driving force to at least one of said plurality of gripper fingers through a force-applying means mounted with respect to the gripper housing, the improvement comprising a sensor having a first element mounted for movement with said force-applying means and having a second element mounted on the gripper housing, responsive to movement of said first element and providing an output indicating movement of said force-applying means to at least a predetermined position, wherein said first element includes a magnet movable towards said second element when said gripper is actuated, and said second element includes means mounted to intercept a portion of the magnetic field generated by said first element to provide an output indicative of the movement of said first element to at least a predetermined distance from said second element, and thus of a corresponding state of said fingers.

3. A gripper including a base, a cover secured to said base, a shaft secured to said base, a piston mounted for reciprocating movement within said cover and axially along said shaft, spring means surrounding said shaft for supporting said piston relative to said base, a plurality of gripping fingers each mounted intermediate its length on a pivot secured to said base and at a first end thereof to said piston and configured and disposed such that a second end thereof extends beyond said base, said gripping fingers being pivotable between first and second states of closure by movement of said piston relative to said base, a positioning rod disposed on said piston and extending toward said base having magnet means for generating a magnetic field disposed on the remote end thereof, and switch means mounted on said base and responsive to said magnetic field for providing an output signal indicative of the position of said magnetic means relative to said switch means and, thus of the state of closure of said gripping fingers.

4. The gripper of claim 3 wherein said base defines a bore through which extends electrical leads which provide means for supplying electric power to said switch means and for receiving said output signal therefrom.

5. The gripper of claim 3 wherein as said piston moves toward said base it creates a magnetic field of increasing strength at said switch means, and wherein said output signal has a defined value dependent on the strength of said magnetic field at said switch means and the position of said magnet means relative to said switch means.

* * * * *